US012125425B2

(12) United States Patent
Park et al.

(10) Patent No.: US 12,125,425 B2
(45) Date of Patent: Oct. 22, 2024

(54) PIXEL AND DISPLAY DEVICE INCLUDING THE SAME

(71) Applicant: Samsung Display Co., LTD., Yongin-si (KR)

(72) Inventors: Junhyun Park, Suwon-si (KR); Jangmi Kang, Seoul (KR); Minjae Jeong, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/958,509

(22) Filed: Oct. 3, 2022

(65) Prior Publication Data

US 2023/0105490 A1 Apr. 6, 2023

(30) Foreign Application Priority Data

Oct. 5, 2021 (KR) ........................ 10-2021-0131762

(51) Int. Cl.
*G09G 3/20* (2006.01)
*G09G 3/3233* (2016.01)

(52) U.S. Cl.
CPC ....... *G09G 3/20* (2013.01); *G09G 2300/0426* (2013.01); *G09G 2300/0819* (2013.01); *G09G 2300/0842* (2013.01); *G09G 2310/0267* (2013.01); *G09G 2310/0275* (2013.01)

(58) Field of Classification Search
None
See application file for complete search history.

(56) References Cited

U.S. PATENT DOCUMENTS

2009/0251392 A1* 10/2009 Kim ..................... G09G 3/3266 345/76
2016/0124491 A1* 5/2016 An ........................ G06F 1/3265 713/323
2018/0226023 A1* 8/2018 Park ..................... G09G 3/3258
2018/0261161 A1* 9/2018 Ota ........................ H10K 50/81
2019/0019454 A1* 1/2019 Chen ...................... H10K 50/82
2020/0234653 A1* 7/2020 Lee ...................... G09G 3/3291
2021/0174737 A1* 6/2021 Park ......................... G09G 3/20
2021/0366397 A1* 11/2021 Na ....................... G09G 3/3258

(Continued)

FOREIGN PATENT DOCUMENTS

KR 10-2018-0112158 10/2018
KR 10-2019-0098315 8/2019

*Primary Examiner* — Sepehr Azari
(74) *Attorney, Agent, or Firm* — KILE PARK REED & HOUTTEMAN PLLC

(57) ABSTRACT

A pixel may include a light emitting element; a data write transistor that writes a data voltage; a driving transistor that applies a driving current to the light emitting element based on the data voltage; a hold capacitor including a first electrode to which a first power supply voltage is applied, and a second electrode electrically connected to a first node; a storage capacitor including a first electrode electrically connected to the first node, and a second electrode electrically connected to a control electrode of the driving transistor; at least one polysilicon thin film transistor; and at least one oxide thin film transistor. The at least one oxide thin film transistor may be disposed between the at least one polysilicon thin film transistor and the hold capacitor, or between the at least one polysilicon thin film transistor and the storage capacitor.

20 Claims, 14 Drawing Sheets

(56) References Cited

U.S. PATENT DOCUMENTS

| | | | | |
|---|---|---|---|---|
| 2022/0084472 A1* | 3/2022 | Kim | G09G 3/3266 |
| 2022/0189397 A1* | 6/2022 | Cao | G09G 3/3233 |
| 2022/0310731 A1* | 9/2022 | Chen | H01L 29/78696 |
| 2023/0028312 A1* | 1/2023 | Wang | G09G 3/3258 |
| 2023/0099387 A1* | 3/2023 | Park | G09G 3/32 345/55 |

* cited by examiner

PIXEL AND DISPLAY DEVICE INCLUDING THE SAME

CROSS-REFERENCE TO RELATED APPLICATION(S)

This application claims priority to and the benefit of Korean Patent Application No. 10-2021-0131762 under 35 U.S.C. § 119, filed on Oct. 5, 2021 in the Korean Intellectual Property Office (KIPO), the entire contents of which are incorporated herein by reference.

BACKGROUND

1. Technical Field

Embodiments relate to a pixel and a display device including the same. Specifically, embodiments relate to a pixel supporting variable frequency driving and a display device including the same.

2. Description of the Related Art

In general, a display device may include a display panel and a display panel driver. The display panel may include gate lines, data lines, emission lines, and pixels. The display panel driver may include a gate driver configured to provide gate signals to the gate lines, a data driver configured to provide data voltages to the data lines, an emission driver configured to provide emission signals to the emission lines, and a driving controller configured to control the gate driver, the data driver, and the emission driver.

A display device supporting variable frequency driving may include a pixel including a polysilicon thin film transistor and an oxide thin film transistor. When a ratio of oxide thin film transistors among transistors included in the pixel is high, a capacitance of a capacitor inside the pixel may be decreased, and a limited pixel-per-inch (ppi) of the display panel may be decreased, so that a resolution of the display panel may be reduced.

SUMMARY

Embodiments provide a pixel for increasing a resolution of a display panel by minimizing (or reducing) the number of oxide thin film transistors included in the pixel.

Embodiments provide a display device that includes a pixel for increasing a resolution of a display panel by minimizing the number of oxide thin film transistors included in the pixel.

A pixel according to an embodiment may include a light emitting element; a data write transistor that writes a data voltage; a driving transistor that applies a driving current to the light emitting element based on the data voltage; a hold capacitor including a first electrode to which a first power supply voltage is applied, and a second electrode electrically connected to a first node; a storage capacitor including a first electrode electrically connected to the first node, and a second electrode electrically connected to a control electrode of the driving transistor; at least one polysilicon thin film transistor; and at least one oxide thin film transistor. The at least one oxide thin film transistor may be disposed between the at least one polysilicon thin film transistor and the hold capacitor, or between the at least one polysilicon thin film transistor and the storage capacitor.

In an embodiment, the at least one oxide thin film transistor may include a first oxide thin film transistor including a control electrode to which a first compensation gate signal is applied, a first electrode electrically connected to the control electrode of the driving transistor, and a second electrode electrically connected to the at least one polysilicon thin film transistor; and a second oxide thin film transistor including a control electrode to which the first compensation gate signal is applied, a first electrode electrically connected to the first node, and a second electrode electrically connected to the at least one polysilicon thin film transistor.

In an embodiment, the control electrode of the first oxide thin film transistor and the control electrode of the second oxide thin film transistor may be electrically connected to a first compensation gate line to which the first compensation gate signal is transmitted.

In an embodiment, the pixel may further include a boosting capacitor including a first electrode electrically connected to the first node, and a second electrode to which a boosting signal is applied.

In an embodiment, the driving transistor may include a first transistor including a control electrode electrically connected to a second node, a first electrode to which the first power supply voltage is applied, and a second electrode electrically connected to a third node. The data write transistor may include a second transistor including a control electrode to which a data write gate signal is applied, a first electrode to which the data voltage is applied, and a second electrode electrically connected to a fourth node.

In an embodiment, the at least one polysilicon thin film transistor may include a third transistor including a control electrode to which a second compensation gate signal is applied, a first electrode electrically connected to a fifth node, and a second electrode electrically connected to the third node; a fourth transistor including a control electrode to which a data initialization gate signal is applied, a first electrode to which a data initialization voltage is applied, and a second electrode electrically connected to the fifth node; a fifth transistor including a control electrode to which the second compensation gate signal is applied, a first electrode to which a reference voltage is applied, and a second electrode electrically connected to the fourth node; a sixth transistor including a control electrode to which an emission signal is applied, a first electrode electrically connected to the third node, and a second electrode electrically connected to an anode electrode of the light emitting element; and a seventh transistor including a control electrode to which a light emitting element initialization gate signal is applied, a first electrode to which a light emitting element initialization voltage is applied, and a second electrode electrically connected to the anode electrode of the light emitting element.

In an embodiment, the first oxide thin film transistor may include an eighth transistor including a control electrode to which the first compensation gate signal is applied, a first electrode electrically connected to the fourth node, and a second electrode electrically connected to the first node. The second oxide thin film transistor may include a ninth transistor including a control electrode to which the first compensation gate signal is applied, a first electrode electrically connected to the second node, and a second electrode electrically connected to the fifth node.

In an embodiment, an $N^{th}$ frame, where N is a positive integer, may include a data write period in which the data voltage is written, and a self-scan period in which the data voltage is not written. The first compensation gate signal may have an activation period in the data write period.

In an embodiment, the first compensation gate signal may have an activation level in the activation period. In the activation period of the first compensation gate signal, the data write gate signal may have at least one active pulse, the second compensation gate signal may have at least one active pulse, and the data initialization gate signal may have at least one active pulse.

In an embodiment, the data write period and the self-scan period may include a bias period. In the bias period, the data write gate signal may have an inactivation level, the first compensation gate signal may have an inactivation level, the data initialization gate signal may have an inactivation level, and the boosting signal may have an activation level.

In an embodiment, in the self-scan period, the data initialization gate signal may have at least one active pulse.

In an embodiment, the pixel may further include a boosting capacitor including a first electrode electrically connected to the control electrode of the driving transistor, and a second electrode to which a boosting signal is applied.

A pixel according to an embodiment may include a light emitting element; a hold capacitor including a first electrode to which a first power supply voltage is applied, and a second electrode electrically connected to a first node; a storage capacitor including a first electrode electrically connected to the first node, and a second electrode electrically connected to a second node; a first transistor including a control electrode electrically connected to the second node, a first electrode to which the first power supply voltage is applied, and a second electrode electrically connected to a third node; a second transistor including a control electrode to which a data write gate signal is applied, a first electrode to which a data voltage is applied, and a second electrode electrically connected to a fourth node; a third transistor including a control electrode to which a second compensation gate signal is applied, a first electrode electrically connected to a fifth node, and a second electrode electrically connected to the third node; a fourth transistor including a control electrode to which a data initialization gate signal is applied, a first electrode to which a data initialization voltage is applied, and a second electrode electrically connected to the fifth node; a fifth transistor including a control electrode to which the second compensation gate signal is applied, a first electrode to which a reference voltage is applied, and a second electrode electrically connected to the fourth node; a sixth transistor including a control electrode to which an emission signal is applied, a first electrode electrically connected to the third node, and a second electrode electrically connected to an anode electrode of the light emitting element; a seventh transistor including a control electrode to which a light emitting element initialization gate signal is applied, a first electrode to which a light emitting element initialization voltage is applied, and a second electrode electrically connected to the anode electrode of the light emitting element; an eighth transistor including a control electrode to which a first compensation gate signal is applied, a first electrode electrically connected to the fourth node, and a second electrode electrically connected to the first node; and a ninth transistor including a control electrode to which the first compensation gate signal is applied, a first electrode electrically connected to the second node, and a second electrode electrically connected to the fifth node. The first to seventh transistors may be polysilicon thin film transistors, and the eighth and ninth transistors may be oxide thin film transistors.

In an embodiment, the pixel may further include a boosting capacitor including a first electrode electrically connected to the first node, and a second electrode to which a boosting signal is applied.

In an embodiment, the pixel may further include a boosting capacitor including a first electrode electrically connected to the second node, and a second electrode to which a boosting signal is applied.

A display device according to an embodiment may include a display panel including a pixel; a gate driver that provides a gate signal to the pixel; a data driver that provides a data voltage to the pixel; and an emission driver that provides an emission signal to the pixel. The pixel may include a light emitting element; a data write transistor that writes the data voltage; a driving transistor that applies a driving current to the light emitting element based on the data voltage; a hold capacitor including a first electrode to which a first power supply voltage is applied, and a second electrode electrically connected to a first node; a storage capacitor including a first electrode electrically connected to the first node, and a second electrode electrically connected to a control electrode of the driving transistor; at least one polysilicon thin film transistor; and at least one oxide thin film transistor, and the at least one oxide thin film transistor is disposed between the at least one polysilicon thin film transistor and the hold capacitor, or between the at least one polysilicon thin film transistor and the storage capacitor.

In an embodiment, the at least one oxide thin film transistor may include a first oxide thin film transistor including a control electrode to which a first compensation gate signal is applied, a first electrode electrically connected to the control electrode of the driving transistor, and a second electrode electrically connected to the at least one polysilicon thin film transistor; and a second oxide thin film transistor including a control electrode to which the first compensation gate signal is applied, a first electrode electrically connected to the first node, and a second electrode electrically connected to the at least one polysilicon thin film transistor.

In an embodiment, the control electrode of the first oxide thin film transistor and the control electrode of the second oxide thin film transistor may be electrically connected to a first compensation gate line to which the first compensation gate signal is transmitted.

In an embodiment, the pixel may further include a boosting capacitor including a first electrode electrically connected to the first node, and a second electrode to which a boosting signal is applied. The driving transistor may include a first transistor including a control electrode electrically connected to a second node, a first electrode to which the first power supply voltage is applied, and a second electrode electrically connected to a third node. The data write transistor may include a second transistor including a control electrode to which a data write gate signal is applied, a first electrode to which the data voltage is applied, and a second electrode electrically connected to a fourth node.

In an embodiment, the at least one polysilicon thin film transistor may include a third transistor including a control electrode to which a second compensation gate signal is applied, a first electrode electrically connected to a fifth node, and a second electrode electrically connected to the third node; a fourth transistor including a control electrode to which a data initialization gate signal is applied, a first electrode to which a data initialization voltage is applied, and a second electrode electrically connected to the fifth node; a fifth transistor including a control electrode to which the second compensation gate signal is applied, a first electrode to which a reference voltage is applied, and a second electrode electrically connected to the fourth node; a sixth transistor including a control electrode to which the emission signal is applied, a first electrode electrically connected to the third node, and a second electrode electrically connected to an anode electrode of the light emitting element; and a seventh transistor including a control electrode to which a light emitting element initialization gate signal is applied, a first electrode to which a light emitting element initialization voltage is applied, and a second electrode electrically connected to the anode electrode of the light emitting element. The first oxide thin film transistor may include an eighth transistor including a control electrode to which the first compensation gate signal is applied, a first electrode electrically connected to the fourth node, and a second electrode electrically connected to the first node. The second oxide thin film transistor may include a ninth transistor including a control electrode to which the first compensation gate signal is applied, a first electrode electrically connected to the second node, and a second electrode electrically connected to the fifth node.

According to the pixel and the display device described above, in the display device supporting the variable frequency driving, the number of the oxide thin film transistors included in the pixel may be minimized (or reduced). Accordingly, a ratio of the oxide thin film transistors among the transistors included in the pixel may decrease, so that the capacitance of the capacitor in the pixel may increase, and a limited ppi of the display panel may increase. As a result, in the display device supporting the variable frequency driving, the resolution of the display panel may increase.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION OF THE EMBODIMENTS

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

The terms "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

The phrase "at least one of" is intended to include the meaning of "at least one selected from the group of" for the purpose of its meaning and interpretation. For example, "at least one of A and B" may be understood to mean "A, B, or A and B."

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Figure 1:
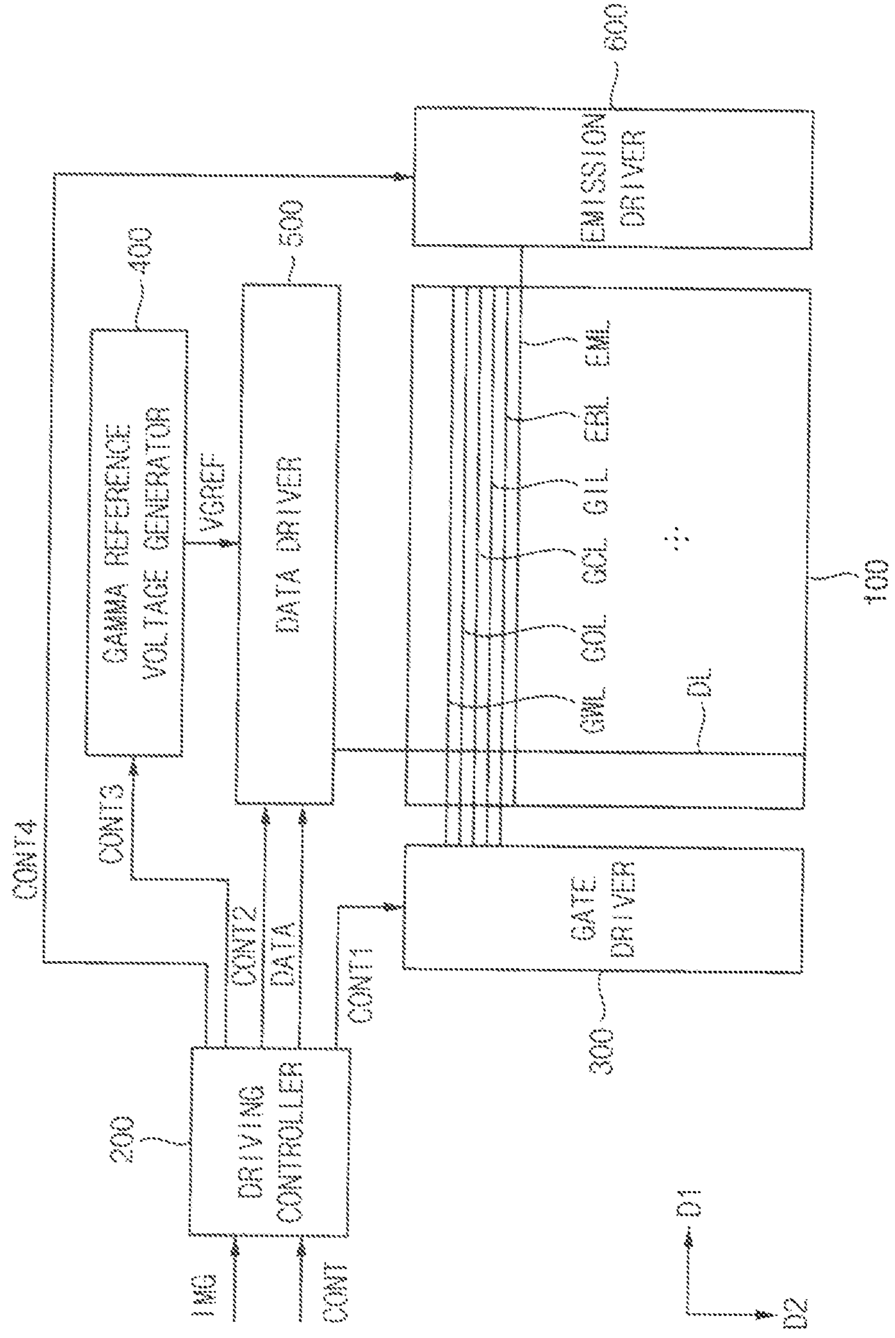
FIG. 1 is a schematic block diagram illustrating a display device according to an embodiment of the disclosure.

FIG. 1 is a schematic block diagram illustrating a display device according to an embodiment of the disclosure.

Referring to FIG. 1, a display device may include a display panel 100 and a display panel driver. The display panel driver may include a driving controller 200, a gate driver 300, a gamma reference voltage generator 400, a data driver 500, and an emission driver 600.

The display panel 100 may include a display part for displaying an image, and a peripheral part that is adjacent to the display part.

The display panel 100 may include gate lines GWL, GOL, GCL, GIL, and EBL, data lines DL, emission lines EML, and pixels electrically connected to the gate lines GWL, GOL, GCL, GIL, and EBL, the data lines DL, and the emission lines EML. The gate lines GWL, GOL, GCL, GIL, and EBL may extend in a first direction D1, the data lines DL may extend in a second direction D2 intersecting the first direction D1, and the emission lines EML may extend in the first direction D1.

The driving controller 200 may receive input image data IMG and an input control signal CONT from an external device. For example, the input image data IMG may include red image data, green image data, and blue image data. The input image data IMG may include white image data. For example, the input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONTE a second control signal CONT2, a third control signal CONT3, a fourth control signal CONT4, and a data signal DATA based on the input image data IMG and the input control signal CONT.

The driving controller 200 may generate the first control signal CONT1 for controlling an operation of the gate driver 300 based on the input control signal CONT and output the generated first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT and output the generated second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT and output the generated third control signal CONT3 to the gamma reference voltage generator 400.

The driving controller 200 may generate the fourth control signal CONT4 for controlling an operation of the emission driver 600 based on the input control signal CONT and output the generated fourth control signal CONT4 to the emission driver 600.

The gate driver 300 may generate gate signals for driving the gate lines GWL, GOL, GCL, GIL, and EBL in response to the first control signal CONT1 received from the driving controller 200. The gate driver 300 may output the gate signals to the gate lines GWL, GOL, GCL, GIL, and EBL.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

For example, the gamma reference voltage generator 400 may be disposed in the driving controller 200 or the data driver 500.

The data driver 500 may receive the second control signal CONT2 and the data signal DATA from the driving controller 200, and receive the gamma reference voltage VGREF from the gamma reference voltage generator 400. The data driver 500 may convert the data signal DATA into an analog data voltage by using the gamma reference voltage VGREF. The data driver 500 may output the data voltage to the data line DL.

The emission driver 600 may generate emission signals for driving the emission lines EML in response to the fourth control signal CONT4 received from the driving controller 200. The emission driver 600 may output the emission signals to the emission lines EML.

Although FIG. 1 illustrates that the gate driver 300 is disposed on a first side of the display panel 100, and the emission driver 600 is disposed on a second side of the display panel 100 for convenience of description, the disclosure is not limited thereto. For example, both the gate driver 300 and the emission driver 600 may be disposed on the first side of the display panel 100. For example, the gate driver 300 and the emission driver 600 may be integral with each other (or may be formed integrally with each other).

Figure 2:
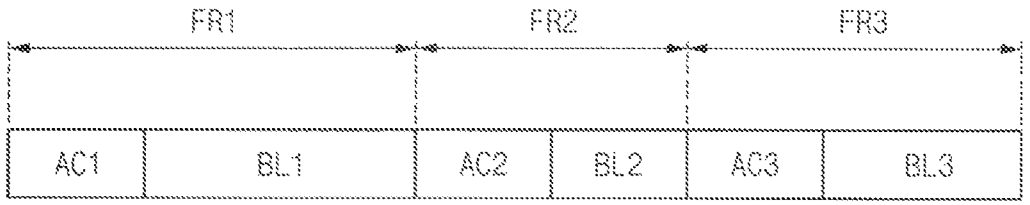
FIG. 2 is a schematic conceptual diagram illustrating a driving frequency of a display panel of FIG. 1.
Figure 3:
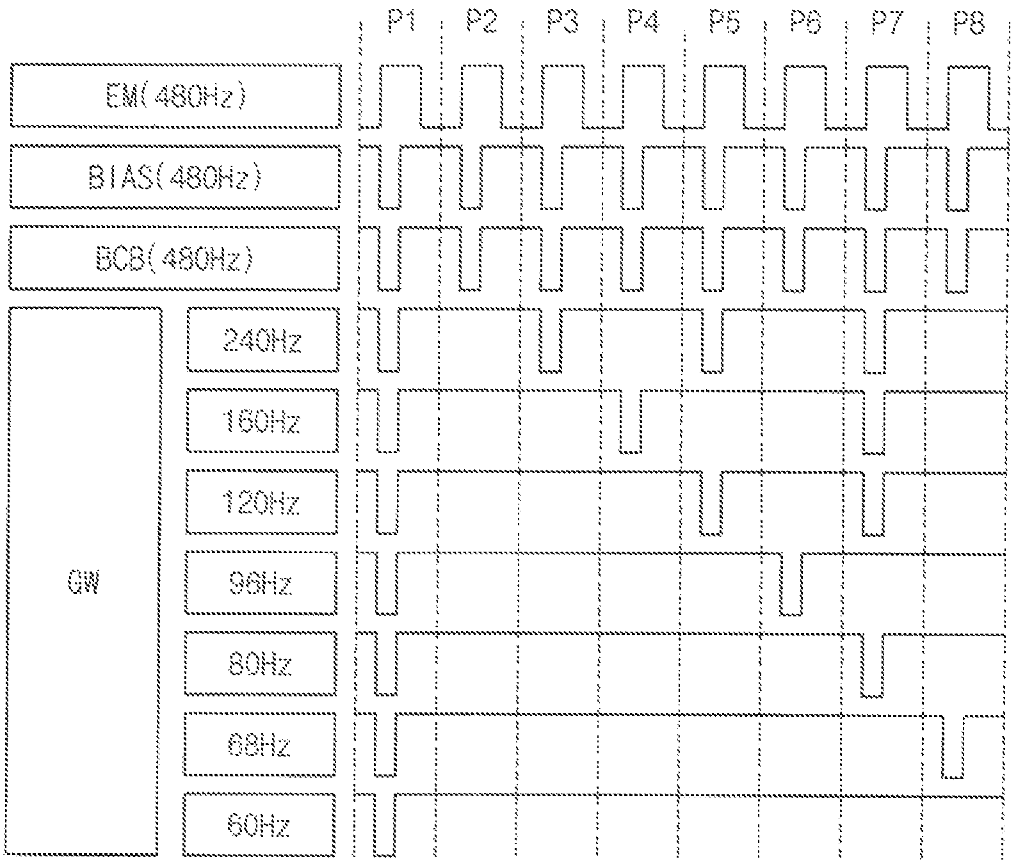
FIG. 3 is a schematic timing diagram illustrating a driving signal of a pixel included in the display panel of FIG. 1.

FIG. 2 is a schematic conceptual diagram illustrating a driving frequency of a display panel 100 of FIG. 1, and FIG. 3 is a schematic timing diagram illustrating a driving signal of a pixel included in the display panel of FIG. 1.

Referring to FIGS. 1 to 3, the display panel 100 may be driven at a variable frequency. For example, the display panel 100 may be driven at about 240 Hz. For example, the display panel 100 may be driven at about 120 Hz. A first frame FR1 having a first frequency may include a first active period AC1 and a first blank period BL1. A second frame FR2 having a second frequency that is different from the first frequency may include a second active period AC2 and a second blank period BL2. A third frame FR3 having a third frequency that is different from each of the first and second frequencies may include a third active period AC3 and a third blank period BL3.

The first active period AC1 and the second active period AC2 may have a same length, and the first blank period BL1 and the second blank period BL2 may have different lengths. The second active period AC2 and the third active period AC3 may have a same length, and the second blank period BL2 and the third blank period BL3 may have different lengths.

In case that the display panel 100 is driven at about 240 Hz, a data write gate signal GW may have an active pulse in a first period P1, a third period P3, a fifth period P5, and a seventh period P7 to perform a data write operation. In case that the display panel 100 is driven at about 120 Hz, the data write gate signal GW may have the active pulse in the first period P1 and the fifth period P5 to perform the data write operation.

For example, in case that the display panel 100 is driven at about 240 Hz, an emission operation EM of a light emitting element included in a pixel may be performed at about 480 Hz. In case that the display panel 100 is driven at about 240 Hz, a bias operation BIAS of a driving transistor included in the pixel may be performed at about 480 Hz. In case that the display panel 100 is driven at about 240 Hz, an initialization operation BCB of the light emitting element included in the pixel may be performed at about 480 Hz. As described above, in case that the display panel 100 is driven at about 240 Hz, and the emission operation EM is driven at about 480 Hz, the display panel 100 may operate in two cycles.

For example, in case that the display panel 100 is driven at about 120 Hz, the emission operation EM of the light emitting element included in the pixel may be performed at about 480 Hz. In case that the display panel 100 is driven at about 120 Hz, the bias operation BIAS of the driving transistor may be performed at about 480 Hz. In case that the display panel 100 is driven at about 120 Hz, the initialization operation BCB of the light emitting element included in the pixel may be performed at about 480 Hz. As described above, in case that the display panel 100 is driven at about 120 Hz, and the emission operation EM is driven at about 480 Hz, the display panel 100 may operate in four cycles.

Although FIG. 3 illustrates that driving frequencies of the display panel 100 are about 240 Hz and about 120 Hz, the driving frequency of the display panel 100 according to the disclosure is not limited thereto. For example, the driving frequency of the display panel 100 may be about 160 Hz, about 96 Hz, about 80 Hz, about 68 Hz, about 60 Hz, or the like.

An operation period of the display device supporting a variable frequency may include a data write period in which the data voltage is written in the pixel, and a self-scan period in which the data voltage is not written in the pixel. For example, the bias operation of the driving transistor may be performed without the data write operation in the self-scan period. The data write period may be arranged in the active periods (e.g., first to third active periods AC1, AC2, and AC3). The self-scan period may be arranged in the blank periods (e.g., first to third blank periods BL1, BL2, and BL3).

A conventional display device supporting variable frequency driving may use a pixel including a polysilicon thin film transistor and an oxide thin film transistor in order to minimize a leakage current inside the pixel. However, in case that a ratio of oxide thin film transistors among transistors included in the pixel is high, a capacitance of a capacitor inside the pixel may be decreased, and a limited pixel-per-inch (ppi) of the display panel may be decreased, so that a resolution of the display panel may be reduced. In order to solve such problems, according to the display device supporting the variable frequency of embodiments, at least one oxide thin film transistor may be disposed between a polysilicon thin film transistor and a hold capacitor, or between the polysilicon thin film transistor and a storage capacitor, so that a number of oxide thin film transistors included in the pixel may be minimized. Therefore, a ratio of the oxide thin film transistors among transistors included in the pixel may be reduced, so that a capacitance of a capacitor inside the pixel may be increased, and a limited ppi of the display panel may be increased. As a result, according to the display device supporting the variable frequency, a resolution of the display panel may be increased.

Figure 4:
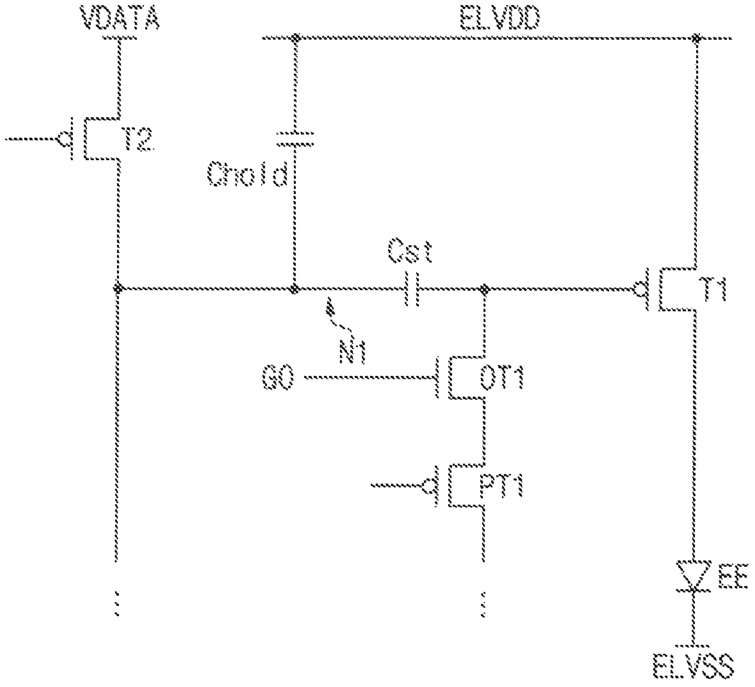
FIG. 4 is a schematic diagram of an equivalent circuit illustrating a part of the pixel included in the display panel of FIG. 1.
Figure 5:
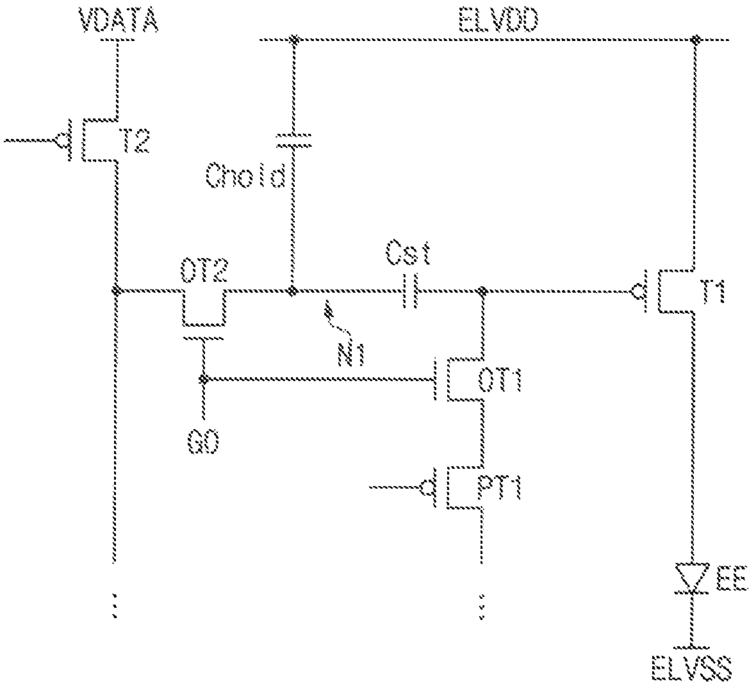
FIG. 5 is a schematic diagram of an equivalent circuit illustrating a part of the pixel of FIG. 4.
Figure 6:
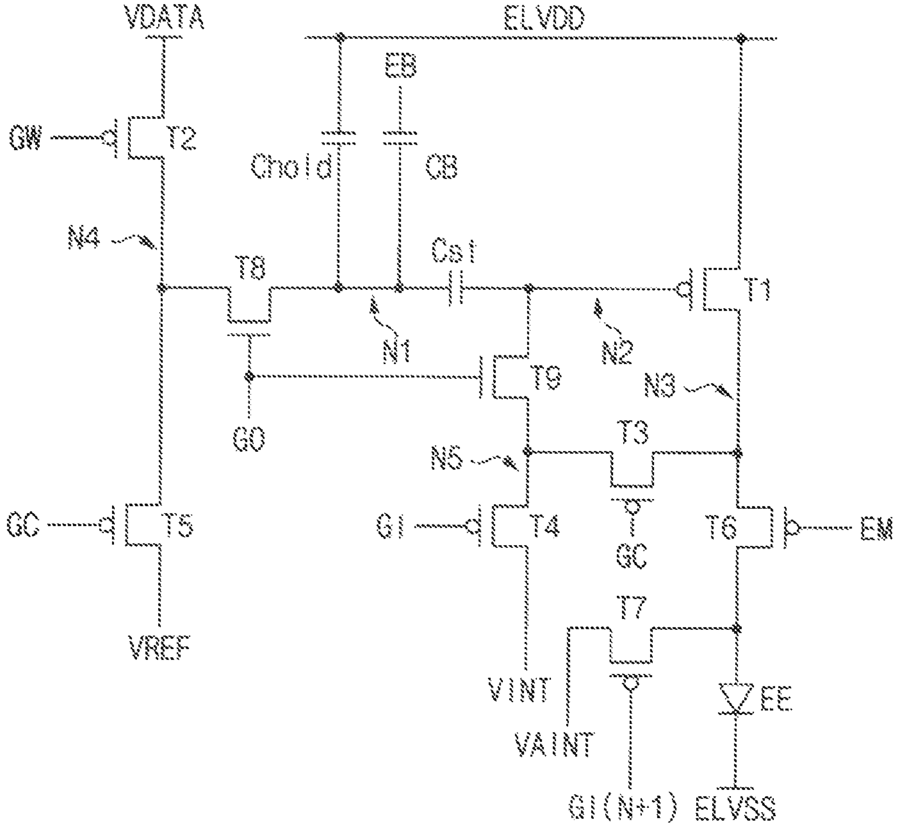
FIG. 6 is a schematic diagram of an equivalent circuit illustrating an example of the pixel of FIG. 4.
Figure 7:
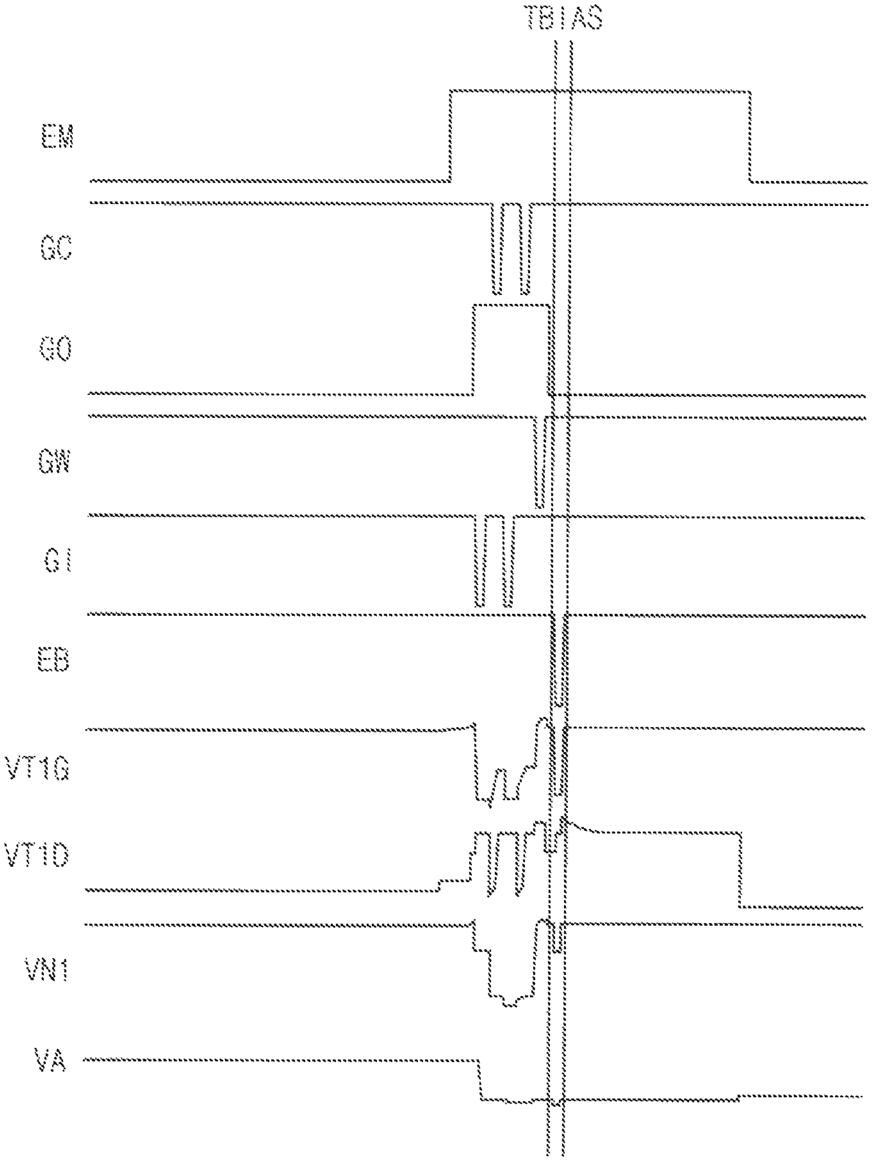
FIG. 7 is a schematic timing diagram illustrating an input signal and a node voltage applied to the pixel of FIG. 4 in a data write period.
Figure 8:
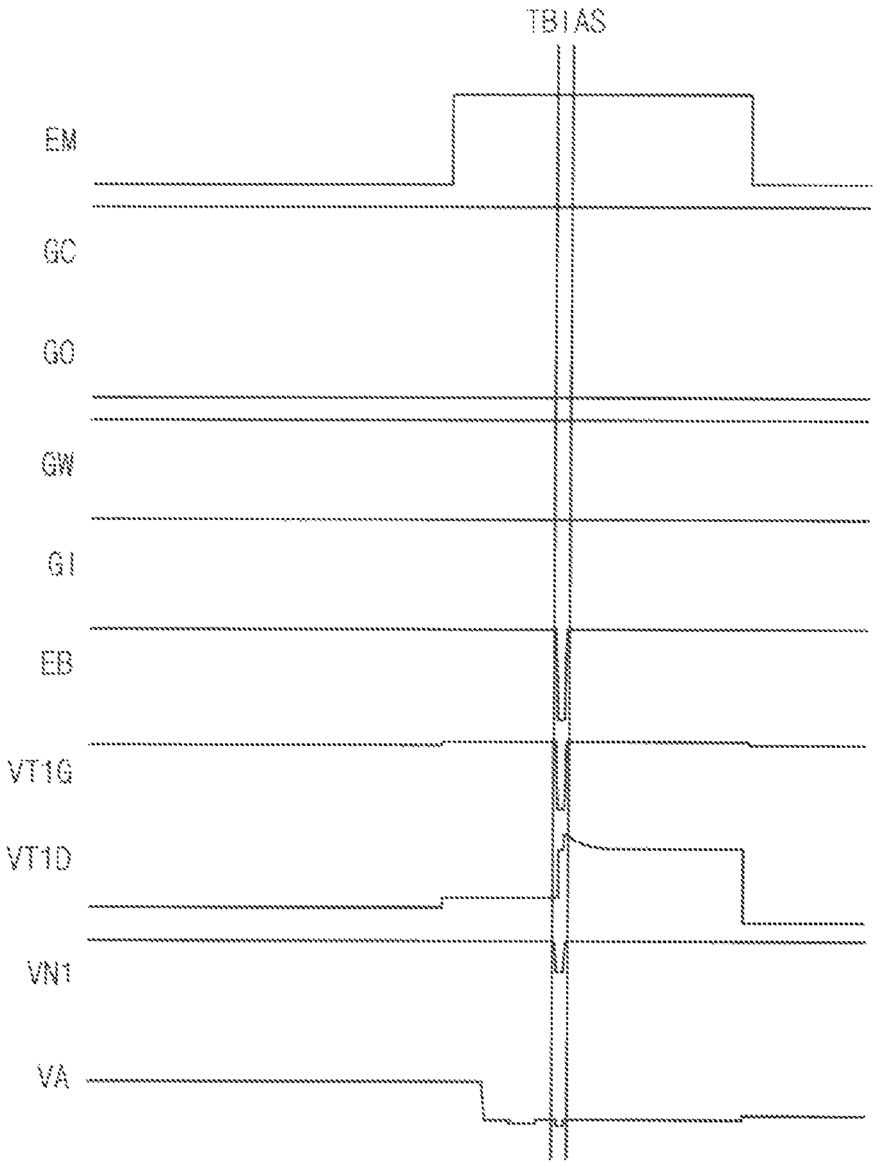
FIG. 8 is a schematic timing diagram illustrating an example of an input signal and a node voltage applied to the pixel of FIG. 4 in a self-scan period.
Figure 9:
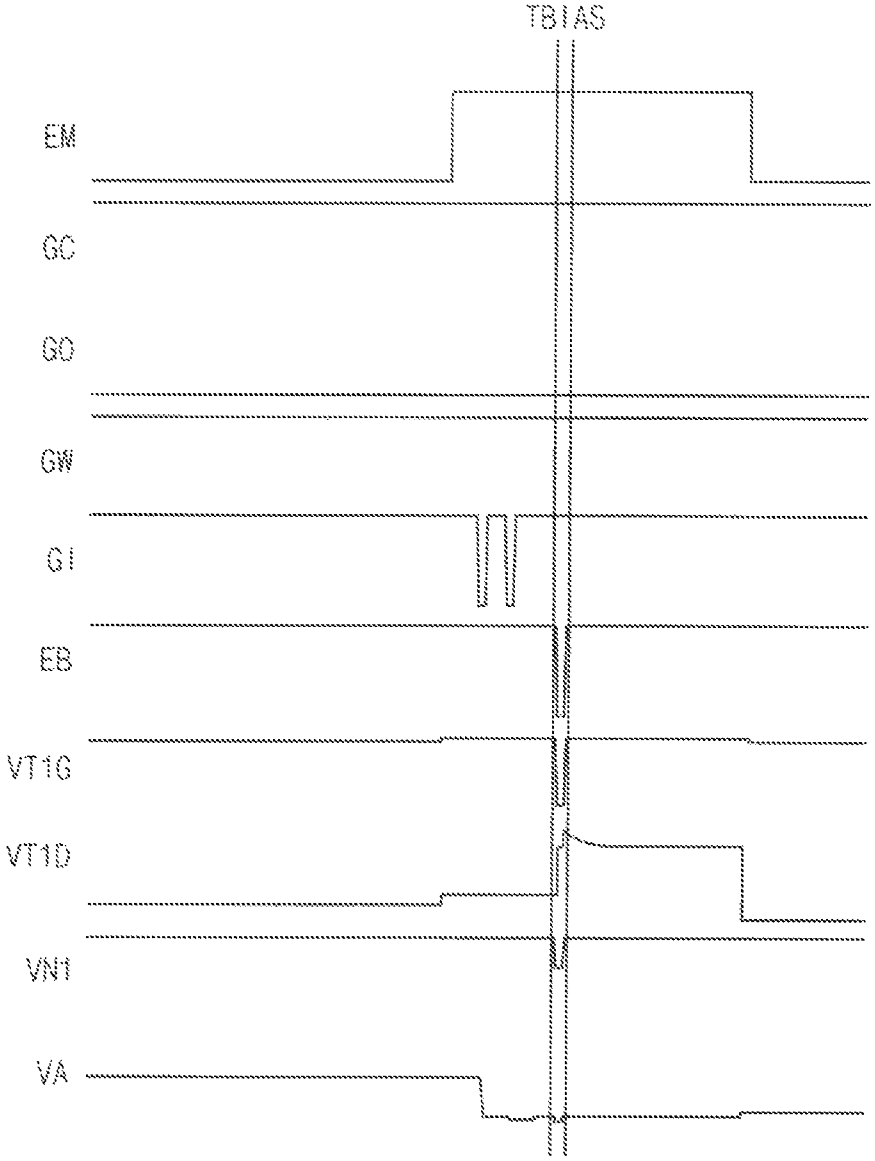
FIG. 9 is a schematic timing diagram illustrating another example of the input signal and the node voltage applied to the pixel of FIG. 4 in the self-scan period.

FIG. 4 is a schematic diagram of an equivalent circuit illustrating a part of the pixel included in the display panel 100 of FIG. 1, FIG. 5 is a schematic diagram of an equivalent circuit illustrating a part of the pixel of FIG. 4, FIG. 6 is a schematic diagram of an equivalent circuit illustrating an example of the pixel of FIG. 4, FIG. 7 is a schematic timing diagram illustrating an input signal and a node voltage applied to the pixel of FIG. 4 in a data write period, FIG. 8 is a schematic timing diagram illustrating an example of an input signal and a node voltage applied to the pixel of FIG. 4 in a self-scan period, and FIG. 9 is a schematic timing diagram illustrating another example of the input signal and the node voltage applied to the pixel of FIG. 4 in the self-scan period.

Referring to FIG. 4, the pixel may include a light emitting element EE, a data write transistor, a driving transistor, a hold capacitor Chold, a storage capacitor Cst, and a first oxide thin film transistor OT1. The light emitting element EE may include a cathode electrode and an anode electrode. The data write transistor (e.g., T2) may write a data voltage VDATA in the data write period. The driving transistor (e.g., T1) may apply a driving current to the light emitting element EE based on the data voltage VDATA. The hold capacitor Chold may include a first electrode to which a first power supply voltage ELVDD is applied, and a second electrode electrically connected to a first node N1. The storage capacitor Cst may include a first electrode electrically connected to the first node N1, and a second electrode electrically connected to a control electrode of the driving transistor. The first oxide thin film transistor OT1 may include a control electrode to which a first compensation gate signal GO is applied, a first electrode electrically connected to the control electrode of the driving transistor, and a second electrode electrically connected to at least one polysilicon thin film transistor (e.g., PT1). For example, the first oxide thin film transistor OT1 may be an oxide thin film transistor, and the driving transistor and the data write transistor may be polysilicon thin film transistors.

Referring to FIG. 5, the pixel may further include a second oxide thin film transistor OT2. The second oxide thin film transistor OT2 may include a control electrode to which the first compensation gate signal GO is applied, a first electrode electrically connected to the first node N1, and a second electrode electrically connected to the at least one polysilicon thin film transistor. For example, the first oxide thin film transistor OT1 and the second oxide thin film transistor OT2 may be oxide thin film transistors, and the driving transistor and the data write transistor may be polysilicon thin film transistors.

The control electrode of the first oxide thin film transistor OT1 may be electrically connected to a first compensation gate line GOL. The control electrode of the second oxide thin film transistor OT2 may be electrically connected to the first compensation gate line GOL. The control electrode of the first oxide thin film transistor OT1 and the control electrode of the second oxide thin film transistor OT2 may receive the first compensation gate signal GO from the same first compensation gate line GOL. In other words, the pixel may transmit the first compensation gate signal GO to the first oxide thin film transistor OT1 and the second oxide thin film transistor OT2 by using a horizontal line.

According to an embodiment, the pixel may further include a boosting capacitor CB including a first electrode electrically connected to the first node N1, and a second electrode to which a boosting signal EB is applied.

Referring to FIG. 6, the pixel may include a first transistor T1 including a control electrode electrically connected to a second node N2, a first electrode to which the first power supply voltage ELVDD is applied, and a second electrode electrically connected to a third node N3. For example, the driving transistor may be the first transistor T1.

The pixel may include a second transistor T2 including a control electrode to which the data write gate signal GW is applied, a first electrode to which the data voltage VDATA is applied, and a second electrode electrically connected to a fourth node N4. For example, the data write transistor may be the second transistor T2.

According to the disclosure, the pixel may include a third transistor T3 including a control electrode to which a second compensation gate signal GC is applied, a first electrode electrically connected to a fifth node N5, and a second electrode electrically connected to the third node N3.

The pixel may include a fourth transistor T4 including a control electrode to which a data initialization gate signal GI is applied, a first electrode to which a data initialization voltage VINT is applied, and a second electrode electrically connected to the fifth node N5.

The pixel may include a fifth transistor T5 including a control electrode to which the second compensation gate signal GC is applied, a first electrode to which a reference voltage is applied, and a second electrode electrically connected to the fourth node N4.

The pixel may include a sixth transistor T6 including a control electrode to which an emission signal EM is applied, a first electrode electrically connected to the third node N3, and a second electrode electrically connected to the anode electrode of the light emitting element EE.

The pixel may include a seventh transistor T7 including a control electrode to which a light emitting element initialization gate signal GI(N+1) is applied, a first electrode to which a light emitting element initialization voltage VAINT is applied, and a second electrode electrically connected to the anode electrode of the light emitting element EE. For example, the light emitting element initialization voltage VAINT may be the same as the data initialization voltage VINT. For example, the light emitting element initialization gate signal GI(N+1) may be a data initialization gate signal of a next frame. For example, the light emitting element initialization gate signal GI(N+1) may be the same as the boosting signal EB.

The pixel may include an eighth transistor T8 including a control electrode to which the first compensation gate signal GO is applied, a first electrode electrically connected to the fourth node N4, and a second electrode electrically connected to the first node N1. For example, the second oxide thin film transistor OT2 may be the eighth transistor T8.

The pixel may include a ninth transistor T9 including a control electrode to which the first compensation gate signal GO is applied, a first electrode electrically connected to the second node N2, and a second electrode electrically connected to the fifth node N5. For example, the first oxide thin film transistor OT1 may be the ninth transistor T9.

In some embodiments, the first power supply voltage ELVDD may be applied to the first electrode of the hold capacitor Chold and the first electrode of the first transistor T1. A second power supply voltage ELVSS may be applied to the cathode electrode of the light emitting element EE. The first power supply voltage ELVDD may be a high power supply voltage, and the second power supply voltage ELVSS may be a low power supply voltage.

Since the pixel includes the first oxide thin film transistor OT1 and the second oxide thin film transistor OT2, the number of the oxide thin film transistors included in the pixel may be minimized. For example, the first to seventh transistors T1 to T7 may be polysilicon thin film transistors, and the eighth transistor T8 and the ninth transistor T9 may be oxide thin film transistors.

Referring to FIGS. 6 to 9, the operation period of the display device supporting the variable frequency may include a data write period in which the data voltage VDATA is written in the pixel, and a self-scan period in which the data voltage VDATA is not written in the pixel. The bias operation of the driving transistor may be performed without the data write operation in the self-scan period. For example, an $N^{th}$ frame (where N is a positive integer) may include a data write period in which the data voltage VDATA is written, and a self-scan period in which the data voltage VDATA is not written.

FIGS. 7 to 9 illustrate variations in the emission signal EM, the first compensation gate signal GO, the second compensation gate signal GC, the data write gate signal GW, the data initialization gate signal GI, the boosting signal EB, a voltage of the control electrode of the first transistor T1, a voltage of the second electrode of the first transistor T1, a voltage of the first node N1, and a voltage of the anode electrode of the light emitting element EE in the data write period and the self-scan period.

As shown in FIG. 7, in the data write period, the data voltage VDATA may be written in the pixel, and an emission operation of the pixel may be performed. The first compensation gate signal GO may have an activation period in the data write period. The first compensation gate signal GO may have an activation level in the activation period. In case that the first compensation gate signal GO has the activation level, the eighth transistor T8 and the ninth transistor T9 may be turned on. In case that the first compensation gate signal GO has an inactivation level, the eighth transistor T8 and the ninth transistor T9 may be turned off.

The data write gate signal GW may have at least one active pulse in the activation period of the first compensation gate signal GO. The second compensation gate signal GC may have at least one active pulse in the activation period of the first compensation gate signal GO. The data initialization gate signal GI may have at least one active pulse in the activation period of the first compensation gate signal GO. As described above, in case that the pixel includes the eighth transistor T8 and the ninth transistor T9 controlled according to the first compensation gate signal GO, the number of the oxide thin film transistors included in the pixel may be minimized. Therefore, the capacitance of the capacitor inside the pixel may be increased, and the limited ppi of the display panel 100 may be increased.

As shown in FIGS. 8 and 9, in the self-scan period, the data voltage VDATA may not be written in the pixel, and only the emission operation of the pixel may be performed. The first compensation gate signal GO may have the inactivation level in the self-scan period. The data write gate signal GW may have an inactivation level in the self-scan period. The second compensation gate signal GC may have an inactivation level in the self-scan period. As shown in FIG. 8, the data initialization gate signal GI may have an inactivation level in the self-scan period. As another example, as shown in FIG. 9, the data initialization gate signal GI may have at least one active pulse in the self-scan period.

Each of the data write period and the self-scan period may include a bias period TBIAS. The data write gate signal GW may have the inactivation level in the bias period TBIAS. The first compensation gate signal GO may have the inactivation level in the bias period TBIAS. The data initialization gate signal GI may have the inactivation level in the bias period TBIAS. The boosting signal EB may have an activation level in the bias period TBIAS. The voltage VA of the anode electrode of the light emitting element EE may be decreased in the bias period TBIAS.

According to an embodiment, the driving transistor T1 may perform the bias operation in response to the boosting signal EB. The boosting signal EB may be the same as the light emitting element initialization gate signal GI(N+1).

In case that the boosting signal EB drops to a low level that is the activation level, a voltage of the second electrode of the boosting capacitor CB to which the boosting signal EB is applied may be decreased. As the voltage of the second electrode of the boosting capacitor decreases, a voltage of the first electrode of the boosting capacitor CB may also be decreased.

Since the first electrode of the boosting capacitor CB is electrically connected to the first node N1, a voltage VN1 of the first node N1 may be decreased. In case that the voltage VN1 of the first node N1 is decreased, a voltage VT1G of the control electrode of the first transistor may also be decreased by the storage capacitor Cst electrically connected between the first node N1 and the control electrode (N2) of the first transistor. An example of a voltage VT1D of the second electrode of the first transistor is shown in FIG. 7.

While a voltage of the first electrode of the driving transistor T1 is maintained at a value of the first power supply voltage ELVDD, the voltage VT1G of the control electrode of the driving transistor T1 may be decreased, so that a gate-source voltage of the driving transistor T1 may be applied, and the bias operation of the driving transistor T1 may be performed by the gate-source voltage of the driving transistor T1.

As described above, according to the display device supporting the variable frequency of the embodiments of the disclosure, the number of the oxide thin film transistors included in the pixel may be reduced or minimized. Therefore, the ratio of the oxide thin film transistors among the transistors included in the pixel may be reduced, so that the capacitance of the capacitor inside the pixel may be increased, and the limited ppi of the display panel 100 may be increased. As a result, the display device supporting the variable frequency may increase the resolution of the display panel 100.

Figure 10:
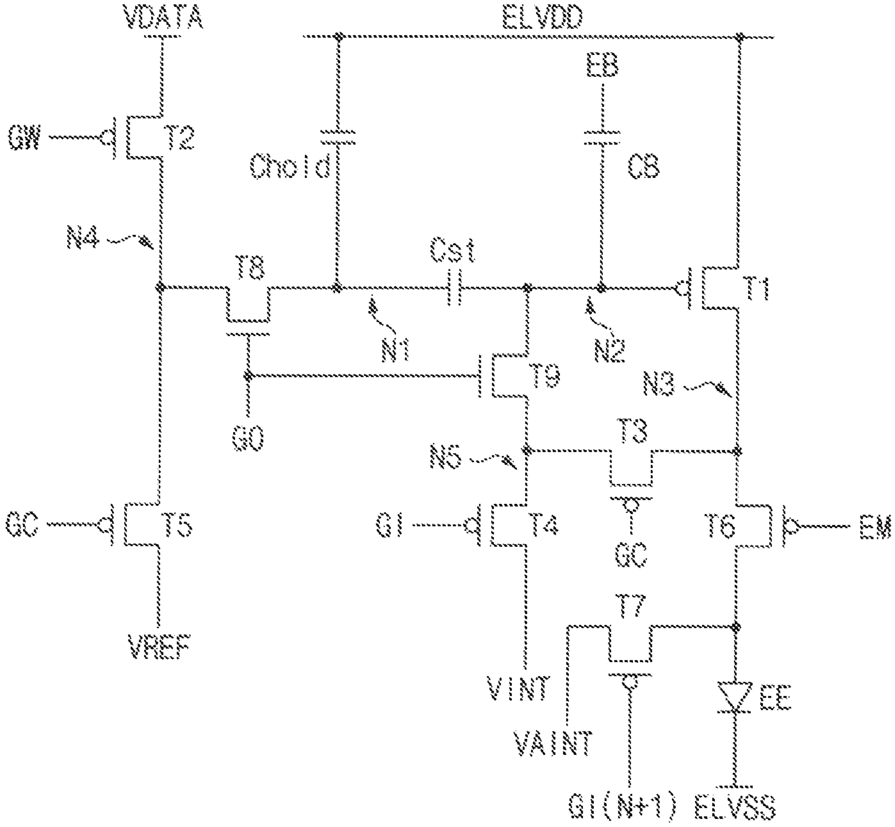
FIG. 10 is a schematic diagram of an equivalent circuit illustrating an example of the pixel of FIG. 4.

FIG. 10 is a schematic diagram of an equivalent circuit illustrating an example of the pixel of FIG. 4.

According to an embodiment, the pixel may further include a boosting capacitor CB including a first electrode electrically connected to the control electrode of the driving transistor, and a second electrode to which a boosting signal EB is applied. Referring to FIG. 10, the pixel may include a first transistor T1 including a control electrode electrically connected to a second node N2, a first electrode to which the first power supply voltage ELVDD is applied, and a second electrode electrically connected to a third node N3. For example, the driving transistor may be the first transistor T1. The pixel may include a second transistor T2 including a control electrode to which the data write gate signal GW is applied, a first electrode to which the data voltage VDATA is applied, and a second electrode electrically connected to a fourth node N4. For example, the second transistor T2 may be the data write transistor.

According to the disclosure, the pixel may include a third transistor T3 including a control electrode to which a second compensation gate signal GC is applied, a first electrode electrically connected to a fifth node N5, and a second electrode electrically connected to the third node N3. The pixel may include a fourth transistor T4 including a control electrode to which a data initialization gate signal GI is applied, a first electrode to which a data initialization voltage VINT is applied, and a second electrode electrically connected to the fifth node N5. The pixel may include a fifth transistor T5 including a control electrode to which the second compensation gate signal GC is applied, a first electrode to which a reference voltage is applied, and a second electrode electrically connected to the fourth node N4. The pixel may include a sixth transistor T6 including a control electrode to which an emission signal EM is applied, a first electrode electrically connected to the third node N3, and a second electrode electrically connected to the anode electrode of the light emitting element EE. The pixel may include a seventh transistor T7 including a control electrode to which a light emitting element initialization gate signal GI(N+1) is applied, a first electrode to which a light emitting element initialization voltage VAINT is applied, and a second electrode electrically connected to the anode electrode of the light emitting element EE. The pixel may include an eighth transistor T8 including a control electrode to which the first compensation gate signal GO is applied, a first electrode electrically connected to the fourth node N4, and a second electrode electrically connected to the first node N1. For example, the second oxide thin film transistor OT2 may be the eighth transistor T8. The pixel may include a ninth transistor T9 including a control electrode to which the first compensation gate signal GO is applied, a first electrode electrically connected to the second node N2, and a second electrode electrically connected to the fifth node N5. For example, the first oxide thin film transistor OT1 may be the ninth transistor T9.

The operation period of the display device supporting the variable frequency may include a data write period in which the data voltage VDATA is written in the pixel, and a self-scan period in which the data voltage VDATA is not written in the pixel. The bias operation of the driving transistor may be performed without the data write operation in the self-scan period. For example, an $N^{th}$ frame (where N is a positive integer) may include a data write period in which the data voltage VDATA is written, and a self-scan period in which the data voltage VDATA is not written.

Each of the data write period and the self-scan period may include a bias period TBIAS. The data write gate signal GW may have the inactivation level in the bias period TBIAS. The first compensation gate signal GO may have the inactivation level in the bias period TBIAS. The data initialization gate signal GI may have the inactivation level in the bias period TBIAS. The boosting signal EB may have an activation level in the bias period TBIAS. The voltage VA of the anode electrode of the light emitting element EE may be decreased in the bias period TBIAS.

According to an embodiment, the driving transistor T1 may perform the bias operation in response to the boosting signal EB. The boosting signal EB may be the same as the light emitting element initialization gate signal GI(N+1). In case that the boosting signal EB drops to a low level that is the activation level, a voltage of the second electrode of the boosting capacitor CB to which the boosting signal EB is applied may be decreased. As the voltage of the second electrode of the boosting capacitor CB decreases, the voltage VT1G of the control electrode of the first transistor T1 may also be decreased. While a voltage of the first electrode of the driving transistor T1 is maintained at a value of the first power supply voltage ELVDD, the voltage VT1G of the control electrode of the driving transistor T1 may be decreased, so that a gate-source voltage of the driving transistor T1 may be applied, and the bias operation of the driving transistor T1 may be performed by the gate-source voltage of the driving transistor T1.

Figure 11:
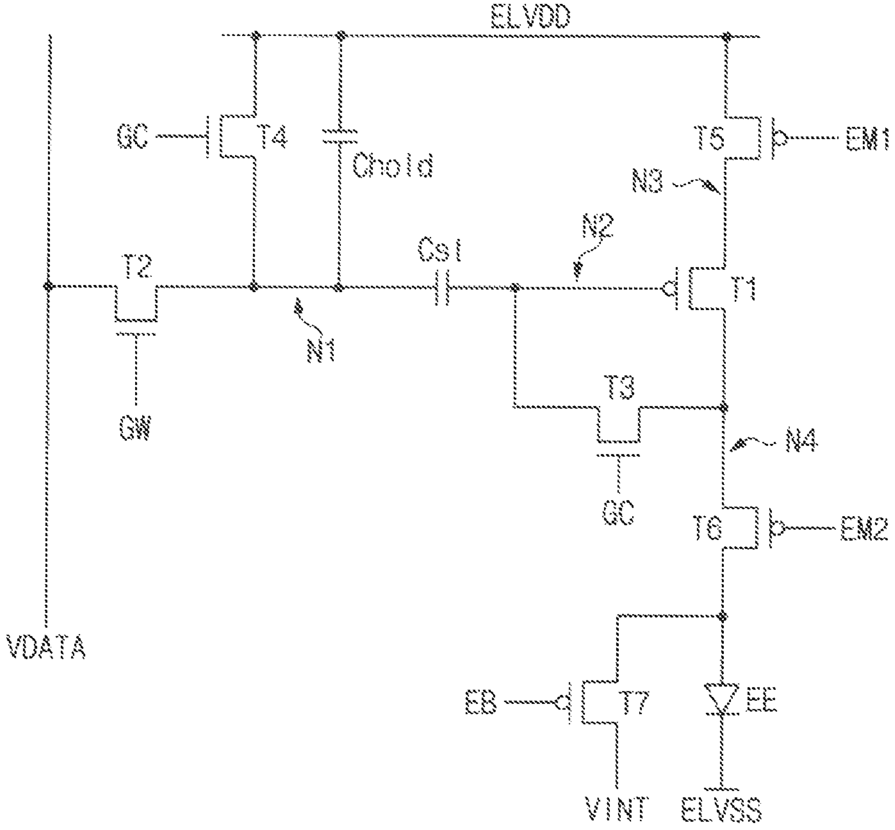
FIG. 11 is a schematic diagram of an equivalent circuit illustrating a pixel according to an embodiment of the disclosure.

FIG. 11 is a schematic diagram of an equivalent circuit illustrating a pixel according to an embodiment of the disclosure.

Referring to FIG. 11, according to an embodiment of the disclosure, the pixel may include a light emitting element EE, a hold capacitor Chold including a first electrode to which a first power supply voltage ELVDD is applied, and a second electrode electrically connected to a first node N1, and a storage capacitor Cst including a first electrode electrically connected to the first node N1, and a second electrode electrically connected to a second node N2.

The pixel may include a first transistor T1 including a control electrode electrically connected to the second node N2, a first electrode electrically connected to a third node N3, and a second electrode electrically connected to a fourth node N4. The pixel may include a second transistor T2 including a control electrode to which a data write gate signal GW is applied, a first electrode to which a data voltage VDATA is applied, and a second electrode electrically connected to the first node N1. The pixel may include a third transistor T3 including a control electrode to which a compensation gate signal GC is applied, a first electrode electrically connected to the second node N2, and a second electrode electrically connected to the fourth node N4. The pixel may include a fourth transistor T4 including a control electrode to which the compensation gate signal GC is applied, a first electrode to which the first power supply voltage ELVDD is applied, and a second electrode electrically connected to the first node N1. The pixel may include a fifth transistor T5 including a control electrode to which a first emission signal EM1 is applied, a first electrode to which the first power supply voltage ELVDD is applied, and a second electrode electrically connected to the third node N3. The pixel may include a sixth transistor T6 including a control electrode to which a second emission signal EM2 is applied, a first electrode electrically connected to the fourth node N4, and a second electrode electrically connected to an anode electrode of the light emitting element EE. The pixel may include a seventh transistor T7 including a control electrode to which a light emitting element initialization gate signal EB is applied, a first electrode to which a light emitting element initialization voltage VINT is applied, and a second electrode electrically connected to the anode electrode of the light emitting element EE.

According to an embodiment, the first transistor T1, the fifth transistor T5, the sixth transistor T6, and the seventh transistor T7 may be polysilicon thin film transistors, and the second transistor T2, the third transistor T3, and the fourth transistor T4 may be oxide thin film transistors.

Figure 12:
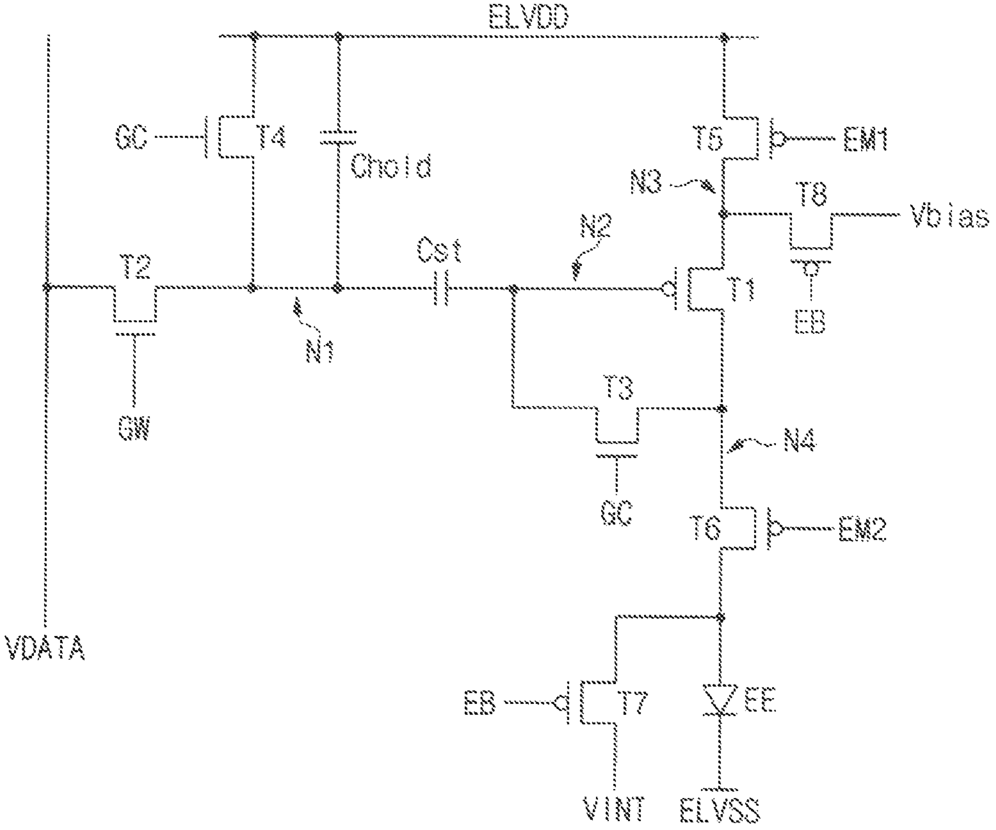
FIG. 12 is a schematic diagram of an equivalent circuit illustrating a pixel according to an embodiment of the disclosure.

FIG. 12 is a schematic diagram of an equivalent circuit illustrating a pixel according to an embodiment of the disclosure.

Referring to FIG. 12, according to an embodiment of the disclosure, the pixel may include: a light emitting element EE, a hold capacitor Chold including a first electrode to which a first power supply voltage ELVDD is applied, and a second electrode electrically connected to a first node N1, and a storage capacitor Cst including a first electrode electrically connected to the first node N1, and a second electrode electrically connected to a second node N2.

The pixel may include a first transistor T1 including a control electrode electrically connected to the second node N2, a first electrode electrically connected to a third node N3, and a second electrode electrically connected to a fourth node N4. The pixel may include a second transistor T2 including a control electrode to which a data write gate signal GW is applied, a first electrode to which a data voltage VDATA is applied, and a second electrode electrically connected to the first node N1. The pixel may include a third transistor T3 including a control electrode to which a compensation gate signal GC is applied, a first electrode electrically connected to the second node N2, and a second electrode electrically connected to the fourth node N4. The pixel may include a fourth transistor T4 including a control electrode to which the compensation gate signal GC is applied, a first electrode to which the first power supply voltage ELVDD is applied, and a second electrode electrically connected to the first node N1. The pixel may include a fifth transistor T5 including a control electrode to which a first emission signal EM1 is applied, a first electrode to which the first power supply voltage ELVDD is applied, and a second electrode electrically connected to the third node N3. The pixel may include a sixth transistor T6 including a control electrode to which a second emission signal EM2 is applied, a first electrode electrically connected to the fourth node N4, and a second electrode electrically connected to an anode electrode of the light emitting element EE. The pixel may include a seventh transistor T7 including a control electrode to which a light emitting element initialization gate signal EB is applied, a first electrode to which a light emitting element initialization voltage VINT is applied, and a second electrode electrically connected to the anode electrode of the light emitting element EE. The pixel may include an eighth transistor T8 including a control electrode to which the light emitting element initialization gate signal EB is applied, a first electrode to which a bias voltage Vbias is applied, and a second electrode electrically connected to the third node N3.

According to an embodiment, the first transistor T1, the fifth transistor T5, the sixth transistor T6, the seventh transistor T7, and the eighth transistor T8 may be polysilicon thin film transistors, and the second transistor T2, the third transistor T3, and the fourth transistor T4 may be oxide thin film transistors.

Figure 13:
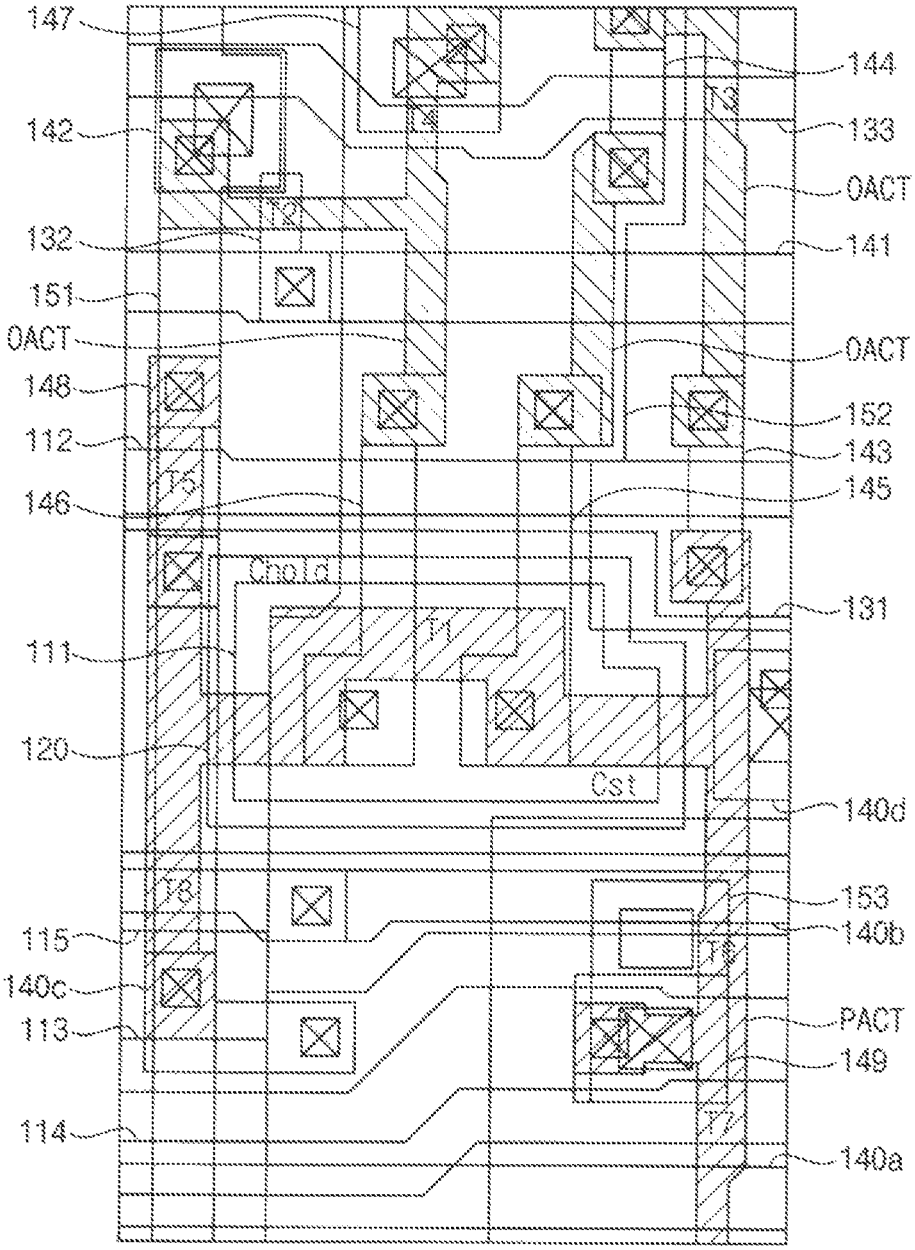
FIG. 13 is a schematic layout view illustrating the pixel of FIG. 12.

FIG. 13 is a schematic layout view illustrating the pixel of FIG. 12.

Referring to FIGS. 12 and 13, according to an embodiment of the disclosure, the pixel may include a first active layer PACT, a first conductive layer 111, 112, 113, 114, and 115, a second conductive layer 120, a second active layer OACT, a third conductive layer 131, 132, and 133, a fourth conductive layer 141, 142, 143, 144, 145, 146, 147, 148, 149, 140*a*, 140*b*, 140*c*, and 140*d*, and a fifth conductive layer 151, 152, and 153.

The first active layer PACT may include polysilicon. The first transistor T1, the fifth transistor T5, the sixth transistor T6, the seventh transistor T7, and the eighth transistor T8 may be formed along the first active layer PACT.

The first conductive layer 111, 112, 113, 114, and 115 may be disposed on the first active layer PACT. The first conductive layer 111, 112, 113, 114, and 115 may include a metal such as copper (Cu), molybdenum (Mo), aluminum (Al), and titanium (Ti). The first conductive layer 111, 112, 113, 114, and 115 may include a first gate pattern 111, a first emission line 112, a second emission line 113, a first light emitting element initialization gate line 114, and an eighth gate pattern 115.

The first gate pattern 111 may include the control electrode of the first transistor T1, and the second electrode of the storage capacitor Cst. The first emission line 112 may transmit the first emission signal EM1. The second emission line 113 may transmit the second emission signal EM2. The first light emitting element initialization gate line 114 may transmit the light emitting element initialization gate signal EB. The eighth gate pattern 115 may include the control electrode of the eighth transistor T8.

The second conductive layer 120 may be disposed on the first conductive layer 111, 112, 113, 114, and 115. The second conductive layer 120 may include a metal such as copper (Cu), molybdenum (Mo), aluminum (Al), and titanium (Ti). The second conductive layer 120 may include the first electrode of the storage capacitor Cst, and the second electrode of the hold capacitor Chold.

The second active layer OACT may be disposed on the second conductive layer 120. The second active layer OACT may include an oxide semiconductor. The second transistor T2, the third transistor T3, and the fourth transistor T4 may be formed along the second active layer OACT.

The third conductive layer 131, 132, and 133 may be disposed on the second active layer OACT. The third conductive layer 131, 132, and 133 may include a metal such as copper (Cu), molybdenum (Mo), aluminum (Al), and titanium (Ti). The third conductive layer 131, 132, and 133 may include a capacitor pattern 131, a second gate pattern 132, and a compensation gate line 133.

The capacitor pattern 131 may include the first electrode of the hold capacitor Chold. The second gate pattern 132 may include the control electrode of the second transistor T2. The compensation gate line 133 may transmit the compensation gate signal GC.

The fourth conductive layer 141, 142, 143, 144, 145, 146, 147, 148, 149, 140*a*, 140*b*, 140*c*, and 140*d* may be disposed on the third conductive layer 131, 132, and 133. The fourth conductive layer 141, 142, 143, 144, 145, 146, 147, 148, 149, 140*a*, 140*b*, 140*c*, and 140*d* may include a metal such as copper (Cu), molybdenum (Mo), aluminum (Al), or titanium (Ti). The fourth conductive layer 141, 142, 143, 144, 145, 146, 147, 148, 149, 140*a*, 140*b*, 140*c*, and 140*d* may include a data write gate line 141, a data connection pattern 142, a first active connection pattern 143, a second active connection pattern 144, a third active connection pattern 145, a fourth active connection pattern 146, a first power supply voltage connection pattern 147, a second power supply voltage connection pattern 148, a first light emitting element connection pattern 149, a light emitting element initialization voltage line 140*a*, a first light emitting element initialization gate line 140*b*, a second emission connection line 140*c*, and a third power supply voltage connection pattern 140*d*.

The data write gate line 141 may transmit the data write gate signal GW. The data connection pattern 142 may electrically connect the second active pattern OACT to a data line 151. The first active connection pattern 143 may electrically connect the first active pattern PACT to the second active pattern OACT. The second active connection pattern 144 may electrically connect parts of the second active pattern OACT, which are spaced apart from each other, to each other. The third active connection pattern 145 may electrically connect the first gate pattern 111 to the second active pattern OACT. The fourth active connection pattern 146 may electrically connect the second conductive layer 120 to the second active pattern OACT. The first power supply voltage connection pattern 147 may electrically connect the second active pattern OACT to a power supply voltage line 152. The second power supply voltage connection pattern 148 may electrically connect the first active pattern PACT to the capacitor pattern 131. The first light emitting element connection pattern 149 may electrically connect the first active pattern PACT to a second light emitting element connection pattern 153. The light emitting element initialization voltage line 140*a* may transmit the light emitting element initialization voltage VINT. The first light emitting element initialization gate line 140*b* may transmit the light emitting element initialization gate signal EB. The second emission connection line 140*c* may electrically connect the first active pattern PACT to the second emission line 113. For example, the bias voltage Vbias may be a high voltage of the second emission signal EM2. The third power supply voltage connection pattern 140*d* may electrically connect the capacitor pattern 131 to the power supply voltage line 152.

The fifth conductive layer 151, 152, and 153 may be disposed on the fourth conductive layer 141, 142, 143, 144, 145, 146, 147, 148, 149, 140*a*, 140*b*, 140*c*, and 140*d*. The fifth conductive layer 151, 152, and 153 may include a metal such as copper (Cu), molybdenum (Mo), aluminum (Al), or titanium (Ti). The fifth conductive layer 151, 152, and 153 may include the data line 151, the power supply voltage line 152, and the second light emitting element connection pattern 153.

The data line 151 may transmit the data voltage VDATA. The power supply voltage line 152 may transmit the first power supply voltage ELVDD. The second light emitting element connection pattern 153 may electrically connect the first light emitting element connection pattern 149 to the anode electrode of the light emitting element EE.

Figure 14:
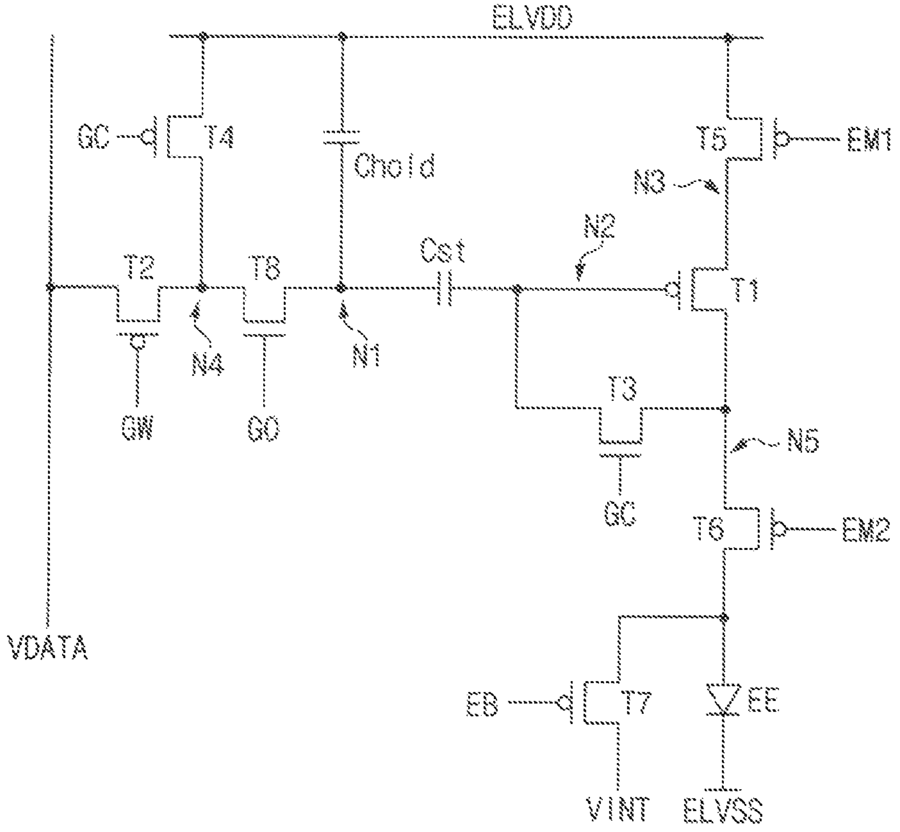
FIG. 14 is a schematic diagram of an equivalent circuit illustrating a pixel according to an embodiment of the disclosure.

FIG. 14 is a schematic diagram of an equivalent circuit illustrating a pixel according to an embodiment of the disclosure.

Referring to FIG. 14, according to an embodiment of the disclosure, the pixel may include a light emitting element EE, a hold capacitor Chold including a first electrode to which a first power supply voltage ELVDD is applied, and a second electrode electrically connected to a first node N1, and a storage capacitor Cst including a first electrode electrically connected to the first node N1, and a second electrode electrically connected to a second node N2.

The pixel may include a first transistor T1 including a control electrode electrically connected to the second node N2, a first electrode electrically connected to a third node N3, and a second electrode electrically connected to a fifth node N5. The pixel may include a second transistor T2 including a control electrode to which a data write gate signal GW is applied, a first electrode to which a data voltage VDATA is applied, and a second electrode electrically connected to a fourth node N4. The pixel may include a third transistor T3 including a control electrode to which a second compensation gate signal GC is applied, a first electrode electrically connected to the second node N2, and a second electrode electrically connected to the fifth node N5. The pixel may include a fourth transistor T4 including a control electrode to which the second compensation gate signal GC is applied, a first electrode to which the first power supply voltage ELVDD is applied, and a second electrode electrically connected to the fourth node N4. The pixel may include a fifth transistor T5 including a control electrode to which a first emission signal EM1 is applied, a first electrode to which the first power supply voltage ELVDD is applied, and a second electrode electrically connected to the third node N3. The pixel may include a sixth transistor T6 including a control electrode to which a second emission signal EM2 is applied, a first electrode electrically connected to the fifth node N5, and a second electrode electrically connected to an anode electrode of the light emitting element EE. The pixel may include a seventh transistor T7 including a control electrode to which a light emitting element initialization gate signal EB is applied, a first electrode to which a light emitting element initialization voltage VINT is applied, and a second electrode electrically connected to the anode electrode of the light emitting element EE. The pixel may include an eighth transistor T8 including a control electrode to which a first compensation gate signal GO is applied, a first electrode electrically connected to the first node N1, and a second electrode electrically connected to the fourth node N4.

According to an embodiment, the first transistor T1, the second transistor T2, the fourth transistor T4, the fifth transistor T5, the sixth transistor T6, and the seventh transistor T7 may be polysilicon thin film transistors, and the third transistor T3 and the eighth transistor T8 may be oxide thin film transistors.

Figure 15:
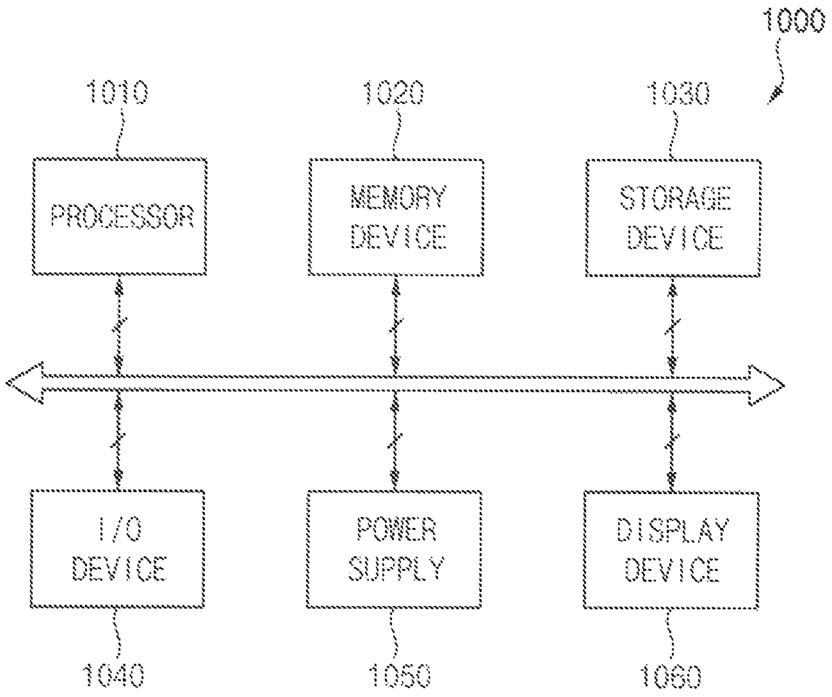
FIG. 15 is a schematic block diagram showing an electronic device according to embodiments of the disclosure.
Figure 16:
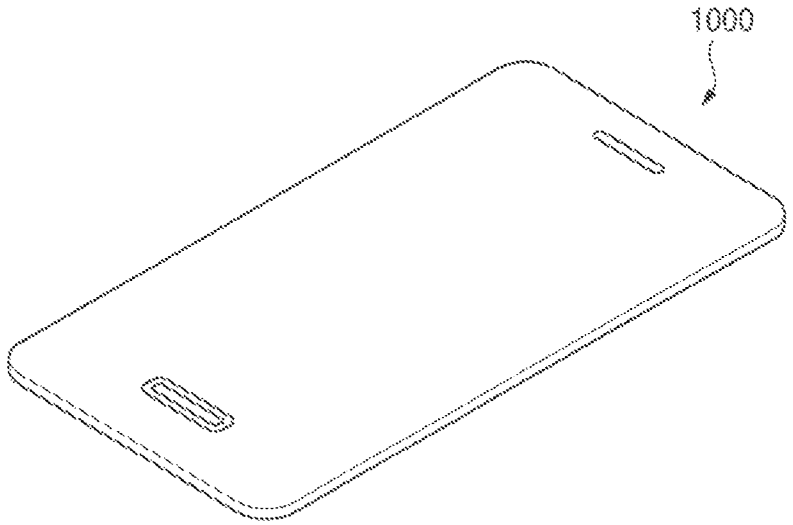
FIG. 16 is a schematic view illustrating an example in which the electronic device of FIG. 15 is implemented as a smartphone.

FIG. 15 is a schematic block diagram illustrating an electronic device 1000 according to embodiments of the disclosure, and FIG. 16 is a schematic view illustrating an example in which the electronic device 1000 of FIG. 15 is implemented as a smartphone.

Referring to FIGS. 15 and 16, an electronic device 1000 may include a processor 1010, a memory device 1020, a storage device 1030, an input/output (I/O) device 1040, a power supply 1050, and a display device 1060. In this case, the display device 1060 may be the display device of FIG. 1. In addition, the electronic device 1000 may further include various ports capable of communicating with a video card, a sound card, a memory card, a universal serial bus (USB) device, or the like, or communicating with other systems. According to an embodiment, as shown in FIG. 16, the electronic device 1000 may be implemented as a smartphone. However, the implementation has been provided for illustrative purposes, and the electronic device 1000 is not limited thereto. For example, the electronic device 1000 may be implemented as a mobile phone, a video phone, a smart pad, a smart watch, a tablet personal computer (PC), a (vehicle) navigation system, a computer monitor, a laptop computer, a head-mounted display device, or the like.

The processor 1010 may perform specific calculations or tasks. According to an embodiment, the processor 1010 may be a microprocessor, a central processing unit (CPU), an application processor, or the like. The processor 1010 may be electrically connected to other components through an address bus, a control bus, a data bus, and the like. According to an embodiment, the processor 1010 may also be electrically connected to an expansion bus such as a peripheral component interconnect (PCI) bus. The memory device 1020 may store data necessary for an operation of the electronic device 1000. Examples of the memory device 1020 may include a non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, and a ferroelectric random access memory (FRAM) device, and/or a volatile memory device such as a dynamic random access memory (DRAM) device, a static random access memory (SRAM) device, and a mobile DRAM device. Examples of the storage device 1030 may include a solid state drive (SSD), a hard disk drive (HDD), a compact disc read-only memory (CD-ROM), and the like. The I/O device 1040 may include an input device such as a keyboard, a keypad, a touch pad, a touch screen, and a mouse, and an output device such as a speaker and a printer. In some embodiments, the display device 1060 may be included in the I/O device 1040. The power supply 1050 may supply a power required for the operation of the electronic device 1000. The display device 1060 may be electrically connected to other components through the buses or other communication links.

The display device 1060 may display an image corresponding to visual information of the electronic device 1000. In this case, the display device 1060 may include a display panel including a pixel, a gate driver configured to provide a gate signal to the pixel; a data driver configured to provide a data voltage to the pixel; and an emission driver configured to provide an emission signal to the pixel. The pixel may include a light emitting element, a data write transistor configured to write the data voltage; a driving transistor configured to apply a driving current to the light emitting element based on the data voltage, a hold capacitor including a first electrode to which a first power supply voltage is applied, and a second electrode electrically connected to a first node, a storage capacitor including a first electrode electrically connected to the first node, and a second electrode electrically connected to a control electrode of the driving transistor, at least one polysilicon thin film transistor, and at least one oxide thin film transistor. The at least one oxide thin film transistor may be disposed between the at least one polysilicon thin film transistor and the hold capacitor, or between the at least one polysilicon thin film transistor and the storage capacitor. Accordingly, according to the display device supporting a variable frequency of the present disclosure, a number of oxide thin film transistors included in the pixel may be reduced or minimized. Therefore, a ratio of the oxide thin film transistors among transistors included in the pixel may be reduced, so that a capacitance of a capacitor inside the pixel may be increased, and a limited ppi of the display panel may be increased. As a result, according to the display device supporting the variable frequency, a resolution of the display panel may be increased. However, since the configuration has been described above, repetitive descriptions thereof will be omitted.

The disclosure may be applied to a display device and an electronic apparatus including the same. For example, the disclosure may be applied to a mobile phone, a smart phone, a video phone, a smart pad, a smart watch, a tablet PC, an automobile navigation system, a television, a computer monitor, a notebook, a digital camera, a head mount display, or the like.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A pixel comprising:

a light emitting element;

a data write transistor that writes a data voltage;

a driving transistor that applies a driving current to the light emitting element based on the data voltage;

a hold capacitor including:

a first electrode to which a first power supply voltage is applied; and a second electrode electrically connected to a first node;

a storage capacitor including:

a first electrode electrically connected to the first node, and a second electrode electrically connected to a control electrode of the driving transistor;

a plurality of polysilicon thin film transistors; and at least one oxide thin film transistor, wherein the at least one oxide thin film transistor is disposed between at least one of the plurality of polysilicon thin film transistors and the hold capacitor or the storage capacitor, the at least one oxide thin film transistor includes:

a first oxide thin film transistor including a second electrode electrically connected to a first one of the plurality of polysilicon thin film transistors; and a second oxide thin film transistor including a second electrode electrically connected to a second one of the plurality of polysilicon thin film transistors, and the plurality of polysilicon thin film transistors include:

a third transistor including a control electrode to which a second compensation gate signal is applied;

a fourth transistor including a control electrode to which a data initialization gate signal is applied;

a fifth transistor including a control electrode to which a second compensation gate signal is applied;

a sixth transistor including a control electrode to which an emission signal is applied; and a seventh transistor including a control electrode to which a light emitting element initialization gate signal is applied.

2. The pixel of claim 1, wherein the first oxide thin film transistor further includes:

a control electrode to which a first compensation gate signal is applied; and a first electrode electrically connected to the control electrode of the driving transistor; and the second oxide thin film transistor further includes:

a control electrode to which the first compensation gate signal is applied; and a first electrode electrically connected to the first node.

3. The pixel of claim 2, wherein the control electrode of the first oxide thin film transistor and the control electrode of the second oxide thin film transistor are electrically connected to a first compensation gate line to which the first compensation gate signal is transmitted.

4. The pixel of claim 2, further comprising:

a boosting capacitor including a first electrode electrically connected to the first node, and a second electrode to which a boosting signal is applied.

5. The pixel of claim 4, wherein the driving transistor includes:

a first transistor including a control electrode electrically connected to a second node, a first electrode to which the first power supply voltage is applied, and a second electrode electrically connected to a third node, and the data write transistor includes a second transistor including:

a control electrode to which a data write gate signal is applied;

a first electrode to which the data voltage is applied; and a second electrode electrically connected to a fourth node.

6. The pixel of claim 5, wherein the plurality of polysilicon thin film transistors includes:

the third transistor further including:

a first electrode electrically connected to a fifth node; and a second electrode electrically connected to the third node;

the fourth transistor further including:

a first electrode to which a data initialization voltage is applied; and a second electrode electrically connected to the fifth node;

the fifth transistor further including:

a first electrode to which a reference voltage is applied; and a second electrode electrically connected to the fourth node;

the sixth transistor further including:

a first electrode electrically connected to the third node; and a second electrode electrically connected to an anode electrode of the light emitting element; and the seventh transistor further including:

a first electrode to which a light emitting element initialization voltage is applied; and a second electrode electrically connected to the anode electrode of the light emitting element.

7. The pixel of claim 6, wherein the first oxide thin film transistor includes an eighth transistor including:

a control electrode to which the first compensation gate signal is applied;

a first electrode electrically connected to the fourth node; and a second electrode electrically connected to the first node, and the second oxide thin film transistor includes a ninth transistor including:

a control electrode to which the first compensation gate signal is applied;

a first electrode electrically connected to the second node; and a second electrode electrically connected to the fifth node.

8. The pixel of claim 6, wherein an $N^{th}$ frame, where N is a positive integer, includes:

a data write period in which the data voltage is written; and a self-scan period in which the data voltage is not written, and the first compensation gate signal has an activation period in the data write period.

9. The pixel of claim 8, wherein the first compensation gate signal has an activation level in the activation period, and in the activation period of the first compensation gate signal, the data write gate signal has at least one active pulse, the second compensation gate signal has at least one active pulse, and the data initialization gate signal has at least one active pulse.

10. The pixel of claim 8, wherein the data write period and the self-scan period include a bias period, and in the bias period, the data write gate signal has an inactivation level, the first compensation gate signal has an inactivation level, the data initialization gate signal has an inactivation level, and the boosting signal has an activation level.

11. The pixel of claim 8, wherein in the self-scan period, the data initialization gate signal has at least one active pulse.

12. The pixel of claim 2, further comprising:

a boosting capacitor including:

a first electrode electrically connected to the control electrode of the driving transistor; and a second electrode to which a boosting signal is applied.

13. A pixel comprising:
a light emitting element;
a hold capacitor including:
a first electrode to which a first power supply voltage is applied; and
a second electrode electrically connected to a first node;
a storage capacitor including:
a first electrode electrically connected to the first node; and
a second electrode electrically connected to a second node;
a first transistor including:
a control electrode electrically connected to the second node;
a first electrode to which the first power supply voltage is applied; and
a second electrode electrically connected to a third node;
a second transistor including:
a control electrode to which a data write gate signal is applied;
a first electrode to which a data voltage is applied; and
a second electrode electrically connected to a fourth node;
a third transistor including:
a control electrode to which a second compensation gate signal is applied;
a first electrode electrically connected to a fifth node; and
a second electrode electrically connected to the third node;
a fourth transistor including:
a control electrode to which a data initialization gate signal is applied;
a first electrode to which a data initialization voltage is applied; and
a second electrode electrically connected to the fifth node;
a fifth transistor including:
a control electrode to which the second compensation gate signal is applied;
a first electrode to which a reference voltage is applied; and
a second electrode electrically connected to the fourth node;
a sixth transistor including:
a control electrode to which an emission signal is applied;
a first electrode electrically connected to the third node; and
a second electrode electrically connected to an anode electrode of the light emitting element;
a seventh transistor including:
a control electrode to which a light emitting element initialization gate signal is applied;
a first electrode to which a light emitting element initialization voltage is applied; and
a second electrode electrically connected to the anode electrode of the light emitting element;
an eighth transistor including:
a control electrode to which a first compensation gate signal is applied;
a first electrode electrically connected to the fourth node; and
a second electrode electrically connected to the first node; and
a ninth transistor including:
a control electrode to which the first compensation gate signal is applied;
a first electrode electrically connected to the second node; and
a second electrode electrically connected to the fifth node, wherein
the first to seventh transistors are polysilicon thin film transistors, and
the eighth and ninth transistors are oxide thin film transistors.

14. The pixel of claim 13, further comprising:
a boosting capacitor including:
a first electrode electrically connected to the first node; and
a second electrode to which a boosting signal is applied.

15. The pixel of claim 13, further comprising:
a boosting capacitor including:
a first electrode electrically connected to the second node; and
a second electrode to which a boosting signal is applied.

16. A display device comprising:
a display panel including a pixel;
a gate driver that provides a gate signal to the pixel;
a data driver that provides a data voltage to the pixel; and
an emission driver that provides an emission signal to the pixel, wherein
the pixel includes:
a light emitting element;
a data write transistor that writes the data voltage;
a driving transistor that applies a driving current to the light emitting element based on the data voltage;
a hold capacitor including:
a first electrode to which a first power supply voltage is applied; and
a second electrode electrically connected to a first node;
a storage capacitor including:
a first electrode electrically connected to the first node; and
a second electrode electrically connected to a control electrode of the driving transistor;
a plurality of polysilicon thin film transistors; and
at least one oxide thin film transistor,
the at least one oxide thin film transistor is disposed between at least one of the plurality of polysilicon thin film transistors and the hold capacitor or the storage capacitor,
the at least one oxide thin film transistor includes:
a first oxide thin film transistor including a second electrode electrically connected to a first one of the plurality of polysilicon thin film transistors;
a second oxide thin film transistor including a second electrode electrically connected to a second one of the plurality of polysilicon thin film transistors, and
the plurality of polysilicon thin film transistors include:
a third transistor including a control electrode to which a second compensation gate signal is applied,
a fourth transistor including a control electrode to which a data initialization gate signal is applied;

a fifth transistor including a control electrode to which a second compensation gate signal is applied, a sixth transistor including a control electrode to which an emission signal is applied, and a seventh transistor including a control electrode to which a light emitting element initialization gate signal is applied.

17. The display device of claim 16, wherein the first oxide thin film transistor further includes:

a control electrode to which a first compensation gate signal is applied; and a first electrode electrically connected to the control electrode of the driving transistor; and the second oxide thin film transistor further includes:

a control electrode to which the first compensation gate signal is applied; and a first electrode electrically connected to the first node.

18. The display device of claim 17, wherein the control electrode of the first oxide thin film transistor and the control electrode of the second oxide thin film transistor are electrically connected to a first compensation gate line to which the first compensation gate signal is transmitted.

19. The display device of claim 17, wherein the pixel further includes:

a boosting capacitor including a first electrode electrically connected to the first node; and a second electrode to which a boosting signal is applied, the driving transistor includes a first transistor including:

a control electrode electrically connected to a second node;

a first electrode to which the first power supply voltage is applied; and a second electrode electrically connected to a third node, and the data write transistor includes:

a second transistor including a control electrode to which a data write gate signal is applied;

a first electrode to which the data voltage is applied; and a second electrode electrically connected to a fourth node.

20. The display device of claim 19, wherein the plurality of polysilicon thin film transistors includes:

the third transistor further including:

a first electrode electrically connected to a fifth node; and a second electrode electrically connected to the third node;

the fourth transistor further including:

a first electrode to which a data initialization voltage is applied; and a second electrode electrically connected to the fifth node;

the fifth transistor further including:

a first electrode to which a reference voltage is applied; and a second electrode electrically connected to the fourth node;

the sixth transistor further including:

a first electrode electrically connected to the third node; and a second electrode electrically connected to an anode electrode of the light emitting element; and the seventh transistor further including:

a first electrode to which a light emitting element initialization voltage is applied; and a second electrode electrically connected to the anode electrode of the light emitting element, the first oxide thin film transistor includes an eighth transistor including:

a control electrode to which the first compensation gate signal is applied;

a first electrode electrically connected to the fourth node; and a second electrode electrically connected to the first node, and the second oxide thin film transistor includes a ninth transistor including:

a control electrode to which the first compensation gate signal is applied;

a first electrode electrically connected to the second node; and a second electrode electrically connected to the fifth node.

* * * * *